United States Patent [19]

MacMillan

[11] Patent Number: 5,689,677
[45] Date of Patent: Nov. 18, 1997

[54] CIRCUIT FOR ENHANCING PERFORMANCE OF A COMPUTER FOR PERSONAL USE

[76] Inventor: David C. MacMillan, 3931 Jefferson Ave., Redwood City, Calif. 94062

[21] Appl. No.: 464,307

[22] Filed: Jun. 5, 1995

[51] Int. Cl.$^6$ ................................................. G06F 12/00
[52] U.S. Cl. ............................................ 395/433; 365/222
[58] Field of Search ............................ 395/433; 365/222

[56] References Cited

U.S. PATENT DOCUMENTS

| 4,172,282 | 10/1979 | Aichelmann | 395/433 |
| 4,924,381 | 5/1990 | Tokuume | 395/800 |
| 4,961,167 | 10/1990 | Kumanoya | 365/189.09 |
| 5,229,969 | 7/1993 | Lee | 365/222 |
| 5,243,699 | 9/1993 | Nickolls et al. | 395/275 |
| 5,280,474 | 1/1994 | Nickolls et al. | 370/60 |
| 5,313,590 | 5/1994 | Taylor | 395/325 |
| 5,345,556 | 9/1994 | Zapisek | 395/200 |
| 5,345,574 | 9/1994 | Sakurada | 395/442 |
| 5,475,645 | 12/1995 | Wada | 365/222 |

OTHER PUBLICATIONS

The Illiac IV Computer, George H. Barnes, Richard M. Brown, Maso Kato, David J. Kuck, Daniel Slotnick, Richard Stokes, IEEE Transations on Cumputers, vol. C–17, No. 8, Aug. 1968; pp. 746–757.

Illiac IV Software and Application Programming, David J Kuck, IEEE Transactions on Computers, vol. C–17, No. 8, Aug. 1968; pp. 758–770.

DAP—A Distributed Array Processor, Dr. S.F. Reddaway, First Annual Symposium on Computer Architecture, Florida, Dec. 1973; pp. 61–65.

Efficient High Speed Computing with the Distributed Array Processor, P.M. Flanders, D.J. Hunt, S.F. Reddaway, D. Parkinson, Symposium on High Speed Computer and Algorithm Organization, Univ. of Illinois, Academic Press; pp. 113–128.

The Connection Machine, W. Daniel Hillis, The MIT Press, 1985.

Connection Machine CM–200 Series, Technical Summary, Thinking Machines Corporation, Jun. 1991; pp. 93–103.

"The MasPar MP–1 Architecutre", Tom Blank, Proceedings for Compcon Spring 90; pp. 20–24.

"The Design of the MasPar MP–1: A Cost Effective Massively Parallel Computer", John R. Nickolls, Compcon, Spring 90; pp. 25–28.

"A Cached VRAM for 3D Graphics", overhead presentation by Michael Deering, Michael Lavelle, and Stephen Schlapp, Sun Microsystems, Inc., 1994; pp. 6.4.1–6.4.10 (153–162).

"A 3.84 GIP's Integrated Memory Array Processing Elements and a 2–Mb SRAM", IEEE Journal of Solid State Circuits, Yamashita, N, et. al., IEEE Journal of Solid State Circuits, Nov. 1994, vol. 29, No. 11; pp. 1336–1343.

"PIM Chip Specifications", Jennifer Schrader and Mark Norder, Supercomputing Research Center, Report SRC TR–93–088, Oct. 4, 1994.

*Primary Examiner*—Tod R. Swann
*Assistant Examiner*—Christopher S. Chow
*Attorney, Agent, or Firm*—Benman Collins & Sawyer

[57] ABSTRACT

A circuit for modifying an instruction stream comprises a first logic circuit capable of issuing instructions and a second logic circuit means responding to the instructions. The circuit also includes a dynamic memory circuit which is responsive to the first logic and a dynamic memory means. The first logic circuit is capable of causing a refresh of the dynamic memory means by inserting a refresh instruction into a sequence of instructions.

2 Claims, 6 Drawing Sheets

| PENTIUM AND SIMD CONTROLLER ADDRESSES OF: | CORRESPOND TO PE ADDRESSES | ON PE # |
|---|---|---|
| 0 THRU 3 | 0 THRU 3 | 0 |
| 4 THRU 7 | 0 THRU 3 | 1 |
| ⋮ | ⋮ | ⋮ |
| 1020 THRU 1023 | 0 THRU 3 | 255 |
| 1024 THRU 1027 | 4 THRU 7 | 0 |
| 1028 THRU 1031 | 4 THRU 7 | 1 |

FIG. 6

CIRCUIT FOR ENHANCING PERFORMANCE OF A COMPUTER FOR PERSONAL USE

FIELD OF THE INVENTION

The present invention relates generally to the field of data processing, and more particularly relates to computer systems for personal use.

BACKGROUND OF THE INVENTION

The history of computing shows that as computers at a given price level become more powerful, the volume of machines sold increases.

Personal computers (PCs) today typically have performance up to about 300 million instructions per second (MIPs). This is much less than supercomputers, which may provide performance of 5,000 MIPs or more. The performance of supercomputers is expensive, however, since these machines typically cost $100,000 or more. If supercomputing performance could be achieved in low cost computers, such as personal computers, this could dramatically expand the market for personal computers.

A personal computer with supercomputer performance could stimulate development of new software applications. There are many applications that could benefit from supercomputer performance in a personal computer. Examples of these applications are signal processing, data compression and decompression, phased-array radars, cryptography, pattern recognition, optimization, genetic algorithms, neural nets, decision support, database mining, statistical analysis, text retrieval and categorization, simulation and modeling, medical imaging, medical signal processing, data visualization, optical character recognition, audio processing, voice synthesis and recognition, speech analysis, vision systems, video processing, multimedia, virtual reality, and CAD/CAM.

Today's fastest uniprocessor-based personal computers are limited to about 300 MIPs. Moreover, it appears that factors such as clock skew, inter-chip signal delays, on-chip wiring delays, diminishing returns from additional superscalar execution units, and the complexities of heavily pipelined design all conspire to limit the maximum performance that may be achieved from uniprocessors. For these reasons, a personal computer providing supercomputer performance should use a parallel computing architecture.

Parallel computers with over 5,000 MIPs performance are readily achievable, as demonstrated by their availability from a number of vendors, although at high prices. A wide range of parallel architectures have been developed. Most efforts can be broadly categorized as either Multiple Instruction Multiple Data (MIMD) or Single Instruction Multiple Data (SIMD).

MIMD machines are particularly useful when there are a number of independent programming threads to be executed, as found in multi-tasking and multi-user environments. For example, MIMD systems appear to work well with Online Transaction Processing. However, MIMD programs have high overhead when a large number of short execution paths must be spawned, processed and then synchronized. This can occur, for example, when inner loops are coded in parallel. MIMD systems are also difficult to code and debug when the problem has a large number of threads with complex data dependencies or complex synchronization requirements. Applications with the above characteristics are often easier to code and debug, and often execute with higher performance, on SIMD systems. The following discussion is directed towards SIMD systems.

The advantages of SIMD include easier program development and debugging, since SIMD programs use a single execution thread and easily-coded parallel data structures. In many cases, inner loops of existing FORTRAN and C programs can be quickly converted to data parallel SIMD code, resulting in immediate performance improvements.

SIMD MIPs are inherently less costly than MIMD MIPs since each SIMD processing element only requires data-path logic, not a complete processor including program counters, interrupt logic, and stack pointers.

The SIMD architecture can be scaled to tens of thousands of processors or more, with excellent processor utilization for many programs. Moreover, this scalability can generally be achieved without the need for reprogramming. In contrast, scaling MIMD execution across more than a few tens of processors has proven difficult, typically requiring major algorithm changes, re-programming, and performance tuning.

A number of computers have been proposed and developed with SIMD architectures, including ILLIAC IV, the Goodyear MPP, BLITZEN, ICL's DAP, Thinking Machines CM-1 and CM-2, and MasPar's MP-1 and MP-2. These machine architectures suffer from a number of shortcomings which will be generally described hereunder.

A first limitation is that many SIMD designs have relatively slow execution dates for data words containing multiple bits. It is also difficult to program these machines for operations on data words with multiple bits. These problems are partly due to the use of Processor Elements (PEs) designed to operate bit-serially. With these machines, operations on multiple-bit data words required either cascading PEs together, or having each PE loop serially through each data bit of its multi-bit word. With cascading, programing is more difficult, since the programmer must track the width of each word. As word widths change, the number of groups of cascaded processors changes, complicating programming and making the algorithm much more difficult to conceptualize. Interprocessor communication is also more complex to program and conceptualize when words span multiple processors and the number of groups of cascaded processors must be tracked. With looping, multiple clock cycles are required to process a multi-bit word, which can reduce performance.

A second limitation is that many SIMD designs have a bottleneck between the chips used to hold PEs and the chips used to provide memory storage. Each time data is moved between the memory and PE logic it must make an inter-chip crossing. This takes time, which decreases performance. Pin count limitations can create a further bottleneck between the separate memory and PE logic chips. When there are a limited number of pins for the PE to memory interface, multiple clock cycles may be required to transfer data for all PEs during a load or store operation. To overcome this pin bottleneck, some SIMD designs have a large register set on each PE, allowing temporary results to remain local to the PE, thereby reducing the number of loads and stores needed. However, this increases die area per PE, resulting in higher costs per PE.

Adding pins can reduce the PE-to-memory bottleneck, but leads to increased packaging costs. It may also require tighter geometries or increased numbers of layers on printed circuits boards, further increasing costs. Furthermore, adding pins increases the number of output drivers needed. This increases die area, which can rapidly increase costs due to the two factors of fewer gross die per wafer and lower yields for larger die. Adding output buffers to drive increased pin counts also increases power dissipation and hence power supply capacity and cost. Increased power dissipation may also require increased space between chips or circuit boards for better cooling, leading to larger, more costly cabinets.

A third limitation of many SIMD designs is that they are a separate subsystem. A limitation resulting from this is that they may have up to three kinds of data memory and up to two kinds of program memory. Specifically, many SIMD designs have separate data memory for the Host CPU, the SIMD Controller, and the PE array. In addition, there are often separate program memories for the Host CPU and the SIMD Controller.

Consider the issues for separate data memory first. Typically, the user is connected to the host system, not to the SIMD Controller or PE array. Generally, the user provides input data to the host and receives output data from the host. Accordingly, if the data memories are separate, an explicit step is required to transfer input data from the host to the SIMD Controller or PE memory array. Similarly, on output, an explicit step is needed to transfer data from the PE array or SIMD Controller to the host. These steps take time and impact performance. A further problem is that in purchasing a system, a user must (a) purchase enough host data memory for the application with the greatest requirement for host data memory, (b) purchase enough SIMD Controller data memory for the application with the greatest requirement for SIMD Controller data memory, and (c) purchase enough PE data memory for the application with the greatest requirement for PE data memory. Generally, each of these three requirements will come from different applications.

It can be seen that when data memory locations are separate for the host, SIMD Controller and PEs, it is not sufficient to simply buy a given total amount of data memory—one must have the enough of each of the three kinds for the applications which will be run. The estimate of how much memory of each type to buy is further complicated if the system is to support many users through timesharing, since there must be enough memory to support all applications that are to run concurrently. It can be seen that having separate data memories adds to system cost since each type of data memory must be large enough for the worst case requirements. Separate data memories also makes it more difficult for the user or manufacturer to specify the required system size to meet the users performance goals and run the required applications. This can delay sales cycles, since a user may be hesitant to purchase a system until a clear understanding is achieved of how much of each type of memory is needed, so as to neither purchase more nor less than needed.

A similar problem exists when program storage for the host and SIMD Controller are separate. In such cases, there must be sufficient host program memory for the application with the greatest requirement for host program memory, and sufficient SIMD Controller program memory for the application with the greatest requirement for SIMD Controller program memory. It is not sufficient to have enough overall program memory—one must have enough of each type for the applications that are to run. Timesharing complicates the estimate of how much program memory of each type is needed. Having separate program memories increases system costs since each type of memory must be large enough for the worst case requirements. As in the data memory case, having to estimate the amount of each type of program memory can delay sales cycles.

A fourth limitation of some SIMD systems is that their memories have high cost and low density. This is a result of the use of static random access memory (SRAM), rather than dynamic random access memory (DRAM), which is higher density, less expensive per bit, bit which must be periodically refreshed. This use of SRAM increases system costs or forces use of smaller memories than would otherwise be possible.

A fifth limitation of some SIMD systems is that they have high system cost in some SIMD systems, a significant part of this cost is due to the use of expensive host systems. Expensive systems sell in lower volumes than less costly systems. Also, selling expensive systems requires a longer, more costly sales cycles. When system costs are high, the systems must typically be shared by many different users, reducing the computing power available to any individual user. If insufficient users are available, the system purchase may not be able to be justified. High system costs also makes it more difficult to cost-justify running any specific application on the system. All these factors can reduce the number of machines sold. A small installed base can reduce the attractiveness of the platform for software developers, thereby reducing the number of software applications available for the system. This can further reduce the market acceptance of the system. Finally, when the host system is an expensive mainframe, it may have to be justified as a worthwhile investment in its own right, independent of the SIMD subsystem. This can further reduce system sales volume and slow sales cycles.

A sixth limitation of some SIMD designs is that they require complex data movements between multiple disks to process data. This limitation arises because these systems use different disk systems for the host system and SIMD array. The user is typically connected to the host system and must usually provide input data and output data, which often resides on disk. This data must be explicitly transferred between the host disk and the PE array disk before it can be processed by the SIMD system. This takes time and reduces performance, particularly for very large data sets. Large data sets are common in SIMD systems since this is what they process best. The PE arrays disk may be limited in size due to technology or cost factors. In may instances, data must be swapped between the host's disk and the PE array disk, further reducing performance.

The swapping might arise from a specific problem with a data set larger than the PE array disk, or in the case of multiple batch or timeshared jobs, whose collective disk storage needs exceed that of the PE array's disk. The latter case can be tougher to anticipate and manage. Timesharing between users whose applications are swapping data between the host disk and PE array disk could result in a horrendous performance penalty. As with the case of separate memories discussed earlier, there is a cost issue in separate disk systems, since each must be large enough to handle the worst-case requirements. In addition, it makes it more difficult to estimate how large a system to buy.

A further problem with this sixth limitation is that when special disk arrays are used for the PE array, they may not enjoy the same rate of decrease of costs that the host disks experience. Typically, a host computer will be used in many non-SIMD installations. Accordingly, the total number of host disks and controllers sold will generally greatly exceed the number of PE array disk and controllers sold. Without the same volumes being manufactured, due to the well-documented learning curve effect, the PE array disks and controllers will not experience the same rate of cost decreases as host disks and controllers.

Over time the ratio of cost of a Megabyte of PE disk storage to cost of a Megabyte of host disk storage will rise.

This negatively impacts the price/performance of the SIMD system when compared to a uniprocessor alternative. This negative impact may be corrected by frequently redesigning the PE array disks to take advantage of the latest technologies used for the hosts disks and controllers. However, frequent redesigns will only be effective in reducing cost if the volume of PE arrays sold is sufficient to absorb the amortized development costs and still result in a significant cost decrease.

In many instances, where hosts sell in the thousands to hundreds of thousands of systems per year, and SIMD systems sell in the tens of units per year, it may not be possible to reduce this growing gap through either volume efficiencies or more frequent redesigns. In such cases, the alternatives include a price/performance ratio that continues to deteriorate relative to uniprocessors with accompanying slowing of sales, or an infusion of outside capital to start a new design (perhaps as a financial restructuring). If left unchecked, this factor and other problems cited earlier above could lead to a SIMD vendor's inability to raise funding or to sell systems at an appealing price/performance ratio.

SIMD architectures have some qualities that make them attractive candidates for adding supercomputer performance to a computer for personal use. However, as a result of the limitations described above, present SIMD architectures are much higher cost than computer systems for personal use. To provide supercomputer performance in a computer for personal use requires improving SIMD's price/performance ratio, decreasing SIMD cost, simplifying SIMD programming, streamlining the issues involved in estimating memory and disk requirements, and expanding SIMD usage. The difficulties in achieving this are illustrated by the fact that many SIMD computer system vendors, competing in the supercomputer segment, have experienced financial difficulties resulting in bankruptcy or restructuring, partly as a result of the high cost and limited usage of their machines. Thinking Machines and Active Memory Technologies are two examples of this. Overcoming the above limitations would allow supercomputing performance to be provided in a low cost computer system for personal use, dramatically expanding the potential market for systems with supercomputer performance. To meet the cost objectives, the SIMD capabilities should not add significant complexity to the architecture of a computer system for personal use. The present invention addresses the above needs.

SUMMARY OF THE INVENTION

The present invention comprises a computer system to which has been added a Single Instruction Multiple Data (SIMD) parallel processing capability. The computer system, to which the SIMD capability has been added, could be a computer system for personal use or other computer system.

A first aspect of the present invention is that it provides shared memory for data and programs that can be used by both the host computer system and the parallel SIMD system. The invention of this shared memory results in lower system cost and more flexibility in using memory both within a given program, and in the case of timeshared execution of different programs.

Another aspect of the present invention is that it provides a convenient mechanism for mapping data structures between the scalar host processor and parallel processing arrays. The invention teaches how to use this mapping to efficiently pass data between the host and processing elements.

Another aspect of the invention is that it shows how parallel SIMD processing can be added inexpensively to existing system architectures. This cost-effective addition of parallel processing can be made to popular, low cost computer systems running popular operating systems, such as Microsoft Windows based personal computers (including Windows 3.1, Windows NT and Windows 95), Apple-compatible personal computers, and UNIX-based systems (including those by Sun Microsystems, Silicon Graphics, Hewlett Packard, and Digital Equipment Corporation).

Another aspect of the present invention is that it allows parallel processing performance to be boosted simply by adding additional shared memory, thereby providing scalable performance at various price points.

Another aspect of the present invention is that it eliminates the Von-Neumann bottleneck between the processing elements and memory by placing both on the same chip. This results in faster performance and reduced interconnections. Simplifying the interconnections reduces system cost, makes it easier to scale performance by adding memory. Since interconnections are a high failure element in a system, the invention improves reliability.

Another aspect of the present invention is that it permits use of a conventional, low cost cache memory with the host processor.

Another aspect of the present invention is that it can be used with either static or dynamic main memory.

Another aspect of the present invention is that it teaches a novel method for ensuring refresh of SIMD memory based on dynamic storage technologies, when the DRAM controller is disabled.

Another aspect of the present invention is that it allows part of the host system's main memory to be conventional memory and part to be shared SIMD memory.

Another aspect of the present invention is that it allows a SIMD computing capability to be added to an existing MIMD system through the use of SIMD memory.

Another aspect of the present invention is that it is highly beneficial in providing cost effective, scalable, high performance within embedded systems dedicated to a specific task, general purpose computing systems, and other systems known today and developed in the future.

BRIEF DESCRIPTION OF THE DRAWINGS

FIG. 6 is a table showing the mapping of the memory of the personal computer architecture of FIG. 3.

DESCRIPTION OF THE PREFERRED EMBODIMENTS

Definitions

Figure 1:
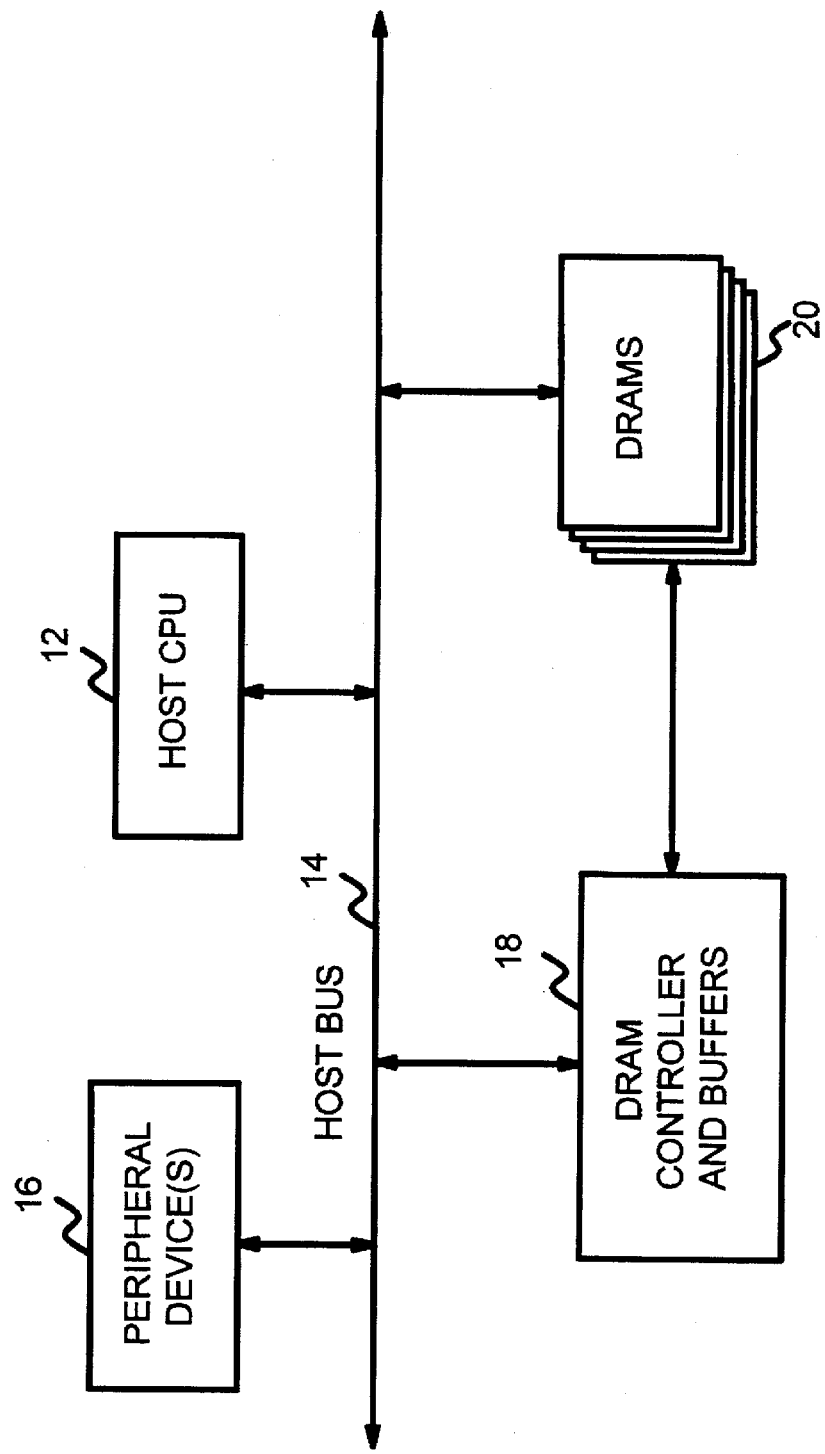
FIG. 1 is a block diagram of a conventional personal computer architecture.

"Atomic operations" are operations that can be executed in a single step by a PE, without requiring looping through multiple data values or cascading of two or more PEs. For example, a 32-bit wide data path could perform atomic operations on data values up to 32 bits wide, including bits, bytes, 16-bit words and 32-bit words. However, it would have to either cascade two data paths, or cycle multiple times through its 32-bit wide data path, to process 64-bit words. According to the definition, these 64-bit operations would not be atomic.

"A computer system for personal use" is a system that is designed primarily for use by an individual or for a specific application, including embedded applications. A computer system for personal use includes personal computers (including, but not limited to, those that are IBM-compatible and Apple-compatible), workstations (including, but not limited to, those that use RISC technology or that use the UNIX operating system), embedded computers (including, but not limited to, computer-based equipment used for telecommunications, data communications, industrial control, process control, printing, settop boxes, signal processing, data compression or decompression, data transformation, data aggregation, data extrapolation, data deduction, data induction, video or audio editing or special effects, instrumentation, data collection or analysis or display, display terminals or screens, voice recognition, voice processing, voice synthesis, voice reproduction, data recording and playback, music synthesis, animation, or rendering), laptops, palmtops, personal digital assistants, notebooks, subnotebooks, and video games.

"A Single Instruction Multiple Data computer system" (or "SIMD computer system") is a computer system which provides a means for a single instruction to operate on multiple data items in parallel. A SIMD computer system may also include any other types of computing capability. For example, a SIMD computer system may include a uniprocessor. As another example, a SIMD Computer system may include a host processor. A further example is that a SIMD computer system may include a Digital Signal Processor (DSP). Another example is that a SIMD computer system may include a systolic array. Another example is that a SIMD computer system may include a Multiple Instruction Multiple Data (MIMD) capability, where MIMD is defined as a computer system which provides a means for multiple instructions to operate on multiple data items in parallel. Another example is that a SIMD computer system may include special functions, including, but not limited to, any mix of the above and following: networking, telecommunications, data communications, data display, data acquisition, data transformation, data aggregation, data extrapolation, data deduction, data induction, and signal processing.

"PC" means personal computer.

"IBM" means International Business Machines.

"PE" means Processor Element. A PE is a single data path in a SIMD computer system and is generally the smallest data path with a unique identity. For example, multiple PEs cascaded together are a number of PEs, not a single larger PE. As another guide to identifying a single PE, most SIMD systems provide communication between individual PEs. As yet another guide, some SIMD systems provide an Active Bit to determine whether a PE is included or excluded from a specific instruction.

A "SIMD Controller" is the part of a SIMD system that contains the program counter used to step through the list of instructions that may include instructions to be executed by the PEs. This list of instructions may also include instructions to be executed by other circuitry, including the SIMD Controller itself, the host computer, and other circuitry. Depending on the architecture, the SIMD Controller may also include branching logic, subroutine stack logic, refresh control, interrupt logic, bus control logic, registers, a data path, and possibly other circuitry.

A "host computer" is an optional part of a SIMD computer system. When present, a host computer is identified by having one or more program counters that are different from that of the SIMD controller. The host computer system may also include, depending on its architecture, branching logic, subroutine stack logic, refresh control, interrupt logic, bus control logic, registers, a data path, multiple processors, co-processors, special data paths, superscalar execution units, memory, I/O capabilities, networking capabilities, and possibly other circuitry.

A "memory storage location" retains information, which may be programs and which may be data, and which can be implemented in any memory technology, including, but not limited to, static random access memory (SRAM), dynamic random access memory (DRAM), flash random access memory, read-only memory (ROM), erasable programmable read-only memory (EPROM), electrically erasable programmable read-only memory (EEPROM), programmable read only memory (PROM), write only memory (WOM), or ferromagnetic memories. ROM, PROM, EPROM, and EEPROM may be particularly useful in embedded applications, although their usefulness is not restricted to embedded applications.

"DRAM technology" means a technology for implementing memory storage locations which requires periodic refresh operations to avoid the loss of memory contents.

Description

The present invention relates to an improvement in the overall speed of a personal computer architecture through the addition of a parallel processing capability. The following description is presented to enable one of ordinary skill in the art to make and use the invention as provided in the context of a particular application and its requirements. Various modifications to the preferred embodiments will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

It has been discovered that the architecture of a computer system for personal use can be modified to add a single instruction multiple data (SIMD) computing capability, resulting in much higher performance computing at moderate cost.

To more clearly see the advantages of the present invention, refer to FIG. 1, which is a block diagram of a conventional personal computer architecture 10. This personal computer architecture 10 includes a Host CPU 12 which is coupled to a Host Bus 14. The computer architecture 10 includes one or more Peripheral Devices 16, such as a disk, a printer and the like, which communicate via the system to the Host CPU 12. Finally, as is well known in the art, there is main DRAM memory 20, which is connected to the Host Bus 14, and connected to a DRAM controller and buffers 18. The DRAM Controller and buffers 18 is also connected to the Host Bus 14.

Figure 2:
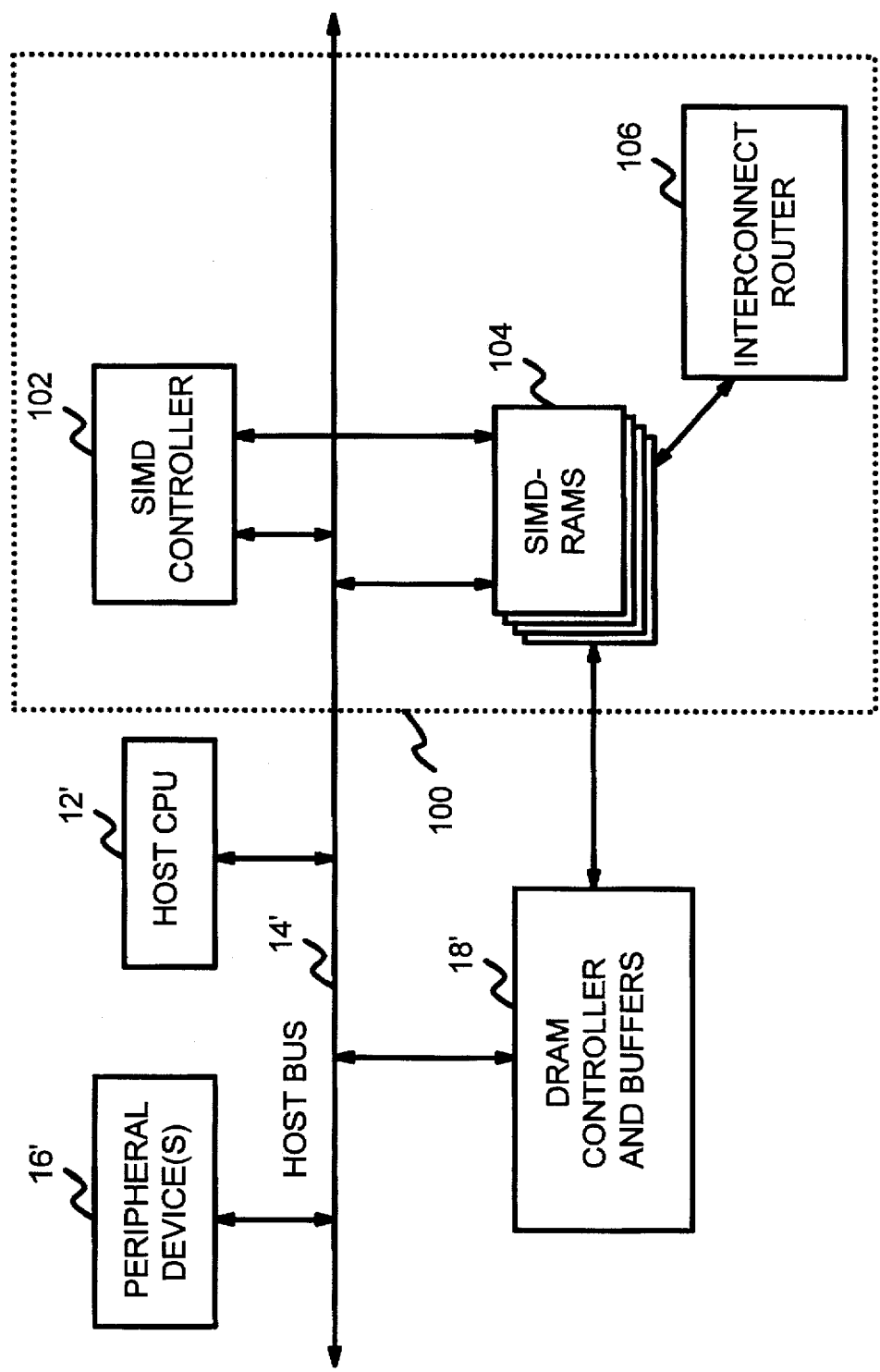
FIG. 2 is a block diagram of a first embodiment of a single instruction multiple data (SIMD) computer system, in accordance with the present invention, which is based on a personal computer architecture.

As has been mentioned before, a uniprocessor system such as that of FIG. 1 has limited processing performance. FIG. 2 shows one embodiment of the invention, which adds more performance to the system of FIG. 1.

The system architecture shown in FIGS. 2 is based on a traditional IBM-compatible personal computer design. However, a system could be built in accordance with the invention for a wide variety of personal computing environments including, but not limited to, an Apple-compatible, RISC-based, or an embedded computing system.

In FIG. 2, the SIMD subsystem 100 includes a SIMD Controller 102, one or more SIMD-RAM devices 104, and an Interconnect Router 106. The SIMD-RAM devices 104 are coupled to the SIMD Controller 102, the Host Bus 14', the DRAM Controller and buffers 18' and the interconnect router 106. The SIMD Controller 102 is also coupled to the Host Bus 14'. This SIMD subsystem 100 adds parallel processing capabilities to the personal computer, resulting in substantial performance improvements.

Figure 3:
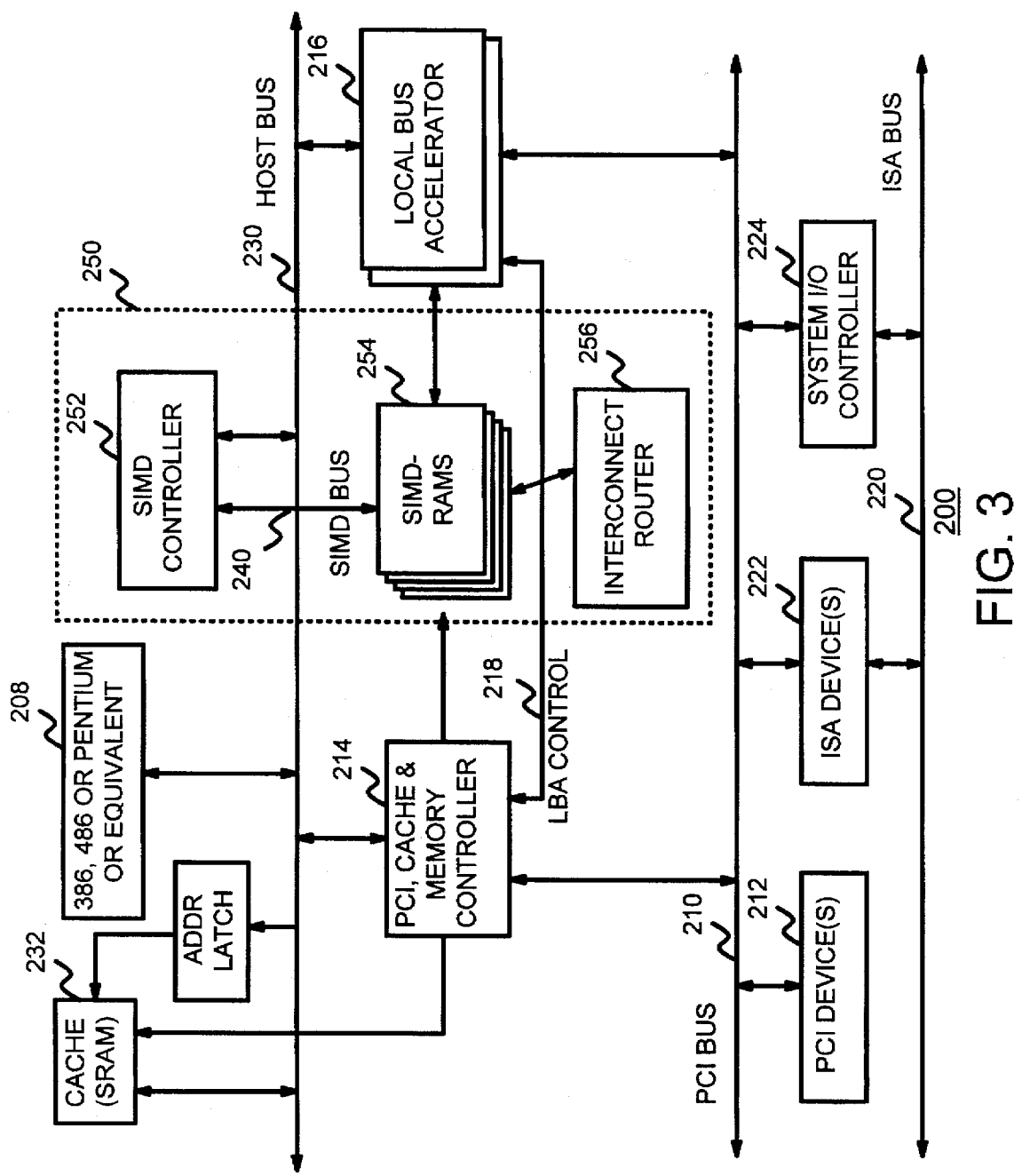
FIG. 3 is a block diagram of a second embodiment of a single instruction multiple data (SIMD) computer system, in accordance with the present invention, which is based on a personal computer architecture.

An additional embodiment of the present invention is shown in FIG. 3. This includes a personal computer system 200, which includes a SIMD subsystem 250, in accordance with the present invention. The SIMD subsystem 250 comprises a SIMD Controller 252, one or more SIMD-RAM devices 254 and Interconnect Router 256. (For further details of the basic PC architecture without the SIMD capability, see the data book "82430 PCIset Cache/Memory Subsystem", Intel Corporation, April 1994, Order Number 290478-003.)

In this embodiment of FIG. 3, the Host CPU 208 is a 386, 486 or Pentium™ processor. As previously mentioned, other processors could be substituted by one skilled in the art, including, but not limited to, those from the 68000 family, SPARC family, Alpha family, MIPS family, or PowerPC family. Another variation is that multiple microprocessors could be included in the personal computer system 200, thereby providing a MIMD capability plus the SIMD system 250. The host CPU 208 is connected to the host bus 230.

In the embodiment of FIG. 3, fast I/O is provided through the Peripheral Component interconnect bus (PCI bus) 210. The PCI, cache and memory controller 214 connects to the PCI bus 210, the host bus 230, and the cache memory 232. One or more local bus accelerators 216 connect to the SIMD-RAMs 254, the host bus 230, and the PCI bus 210. A LBA control signal 218 connects the local bus accelerator 216 to the PCI, Cache and memory controller 218. The PCI bus 210 can support up to 133 Mbytes/second peak transfer rate in its current 32-bit version. PCI Devices 212 such as striped conventional disk sets, high performance RAID arrays, and/or HiPPI channels could be placed on the PCI bus 210 for high bandwidth disk I/O and communications.

The Industry Standard Architecture bus (ISA bus) 220 connects to the PCI bus 210 through the system I/O controller 224. The ISA bus 220 allows use of the wide variety of ISA devices 222 that are designed for the ISA bus, such as disk controllers, multimedia boards, and networking boards.

Aside from the three new device types—the SIMD Controller 252, SIMD-RAM devices 254 and interconnect router 256—the computer 200 uses standard PC components.

The following discussion will describe each of the new devices in detail. It should be understood that although the following discussion will be in terms of the system shown in FIG. 3, the present invention can be utilized in a variety of environments and architectures, and that use would be within the spirit and scope of the present invention. Also, variations can be made in the design of each of the three new devices, and these variations would be within the spirit and scope of the present invention.

The SIMD Controller 252

In this embodiment, the SIMD Controller 252 includes the program counter, branching logic, subroutine stack logic, SIMD-RAM refresh control, and interrupt management logic for the SIMD subsystem 250. It also includes a 32-bit data path for processing scalar values. Using the SIMD bus 240, the SIMD Controller 252 globally broadcasts data values and opcodes to the SIMD-RAMs 254 and can accept data values from a specific PE within the SIMD-RAMs 254. The SIMD bus 240 also includes an open-collector driven global-ORed result signal for parallel boolean operations. Using DeMorgan's theorem, this can also be used to provide a global-AND capability. Other variations of SIMD Controller could also be used.

One variation that might be employed is to have the SIMD Controller interface to the SIMD-RAMs by connecting the SIMD-RAMs to the host bus 230, so as to eliminate the SIMD bus 240 and minimize the pin count on the SIMD-RAMs. The global-OR function could be implemented using open-collector drivers on the SIMD-RAMs, by polling, or through other means.

In the embodiment of FIG. 3, the Host CPU 208 and SIMD system 250 could run under a variety of operating systems, including, but not limited to, Windows 95 and Windows NT. SIMD programs can be compiled as subroutines using a compiler and then linked to traditional Host CPU 208 programs. Using this convention, all SIMD processing would be initiated from a uniprocessor program. This uniprocessor program will be referred to as the parent uniprocessor program. Under this convention, once a SIMD program was activated, it could subsequently call other SIMD routines or call a Host CPU 208 program. Further calls could be made between the Host CPU 208 program and SIMD system 250, resulting in multiple levels of nesting of subroutine calls on both the Host CPU 208 and SIMD system 250.

Note that other conventions could also be used. For example, the roles could be reversed, with all processing initiated by a parent program on the SIMD subsystem 250.

Figure 4:
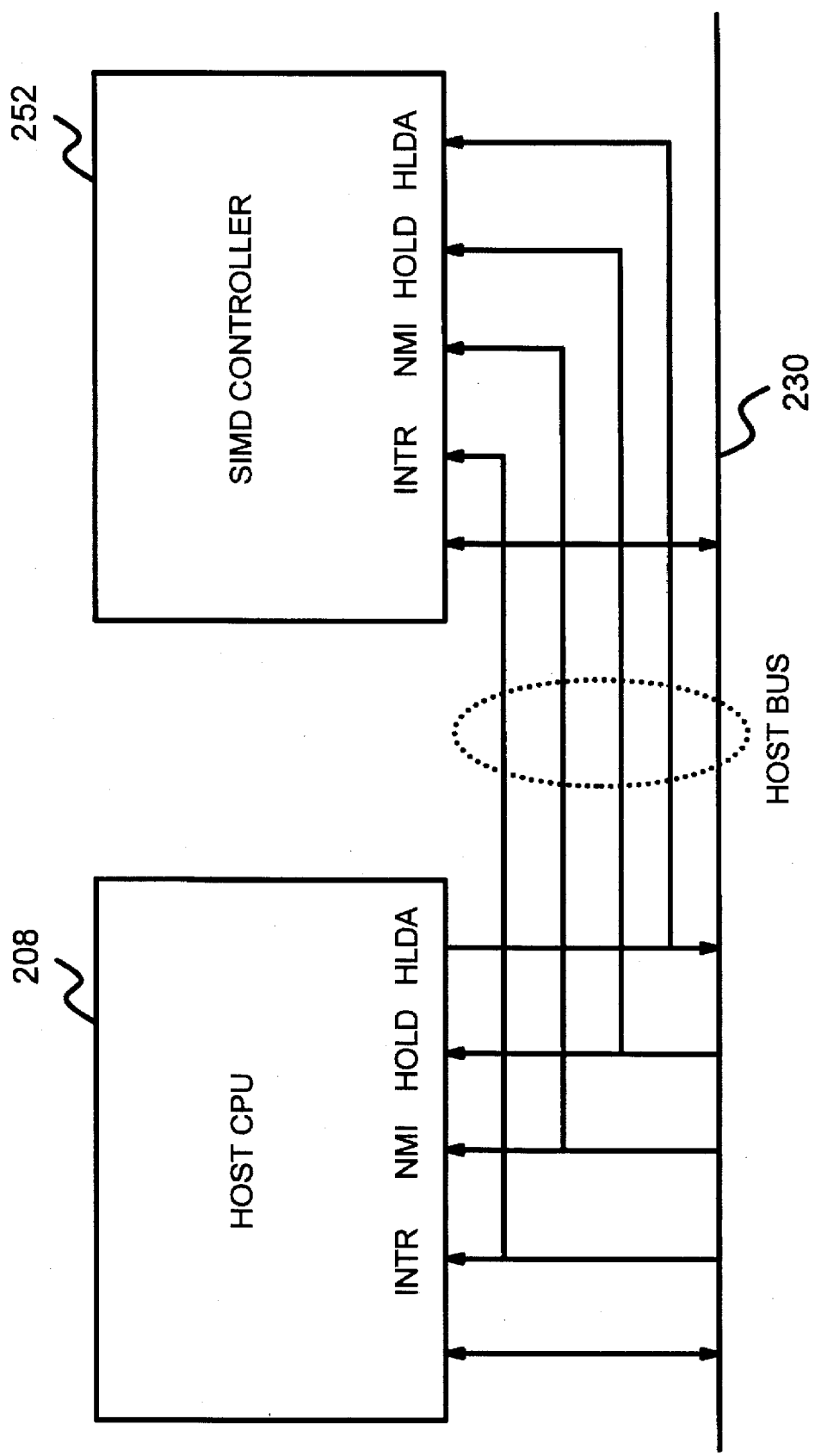
FIG. 4 is a block diagram showing the interaction of the SIMD Controller with the Host CPU for interrupts and bus control in accordance with the present invention.

FIG. 4 shows a more detailed block diagram of the relationship between the SIMD Controller 252 and the Host CPU 208. Consider the situation where the Host CPU 208 is executing a uniprocessor program. At this point, the SIMD Controller 252 is idle. When the uniprocessor program reaches a point where SIMD program execution is to begin, the uniprocessor program calls a system routine to start SIMD Controller execution. This system routine could start the SIMD Controller 252, for example, by a write by the Host CPU 208 to an I/O port on the SIMD Controller 252. Alternatively, a read or other mechanism could be used to initiate processing by the SIMD Controller 252.

When the SIMD Controller 252 is started, it requests control of the Host Bus 230 from the Host CPU 208. This could be implemented as shown in FIG. 4 through a HOLD/HLDA handshake with the Host CPU 208, or through other bus control protocols, including, but not limited to, bus control protocols implemented by a chip or chips other than the Host CPU 208. In the HOLD/HLDA protocol connection shown in FIG. 4, the SIMD Controller 252 asserts HOLD to request bus control from the Host CPU 208. The Host CPU 208 completes its current activity and relinquishes the bus, signaling this by asserting HLDA.

At this point, bus control transfers to the SIMD Controller 252. The SIMD Controller 252 then executes the SIMD program. When the SIMD program is complete, the SIMD Controller 252 de-asserts HOLD to signal it is done with the bus. The Host CPU 208 then regains bus control, and signals this by de-asserting HLDA. At this point, execution is returned to the Host CPU 208 and the SIMD Controller 252 goes idle.

In most systems, it is desirable to allow the Host CPU 208 to service any interrupts as soon as possible, even if they occur during SIMD processing. This can be accomplished, for example, by having the SIMD Controller 252 monitor all of the Host CPU's 208 interrupt lines, including both maskable and non-maskable interrupts. This can be done as shown in FIG. 4, by connecting the SIMD Controller 252 directly to the Host CPU's 208 non-maskable (NMI) and maskable (INTR) interrupt lines. When an interrupt occurs, the SIMD Controller 252 detects this and releases bus control back to the Host CPU 208. This allows the Host CPU 208 to respond quickly to the interrupt.

In the case of maskable interrupts, the interrupt may be masked by a register within the Host CPU 208 that is not visible to the SIMD Controller 252. In such a case, the system must properly handle receipt of am asked interrupt. This could be handled by providing a similar masking register (not shown) on the SIMD Controller 252 that is set or cleared, as needed, by an I/O port write whenever the host program calls a SIMD routine, or alternatively whenever software detects or makes changes to the status of the Host CPU's 208 masking register. This SIMD Controller masking register would prevent the SIMD Controller 252 from releasing bus control back to the Host CPU 208 if am asked interrupt is received. Alternatively, maskable interrupts could be handled by always returning bus control to the Host CPU 208 on any interrupt, masked or otherwise, and letting the Host CPU's 208 system software either return processing back to the SIMD Controller 252 immediately for the masked interrupt case, or service the interrupt and then return control, for the unmasked or non-maskable case.

With some processors, such as the Pentium processor, internal instruction execution of the uniprocessor program will continue from the internal caches following the point when bus control has been relinquished through HOLD/HLDA handshaking. In such cases, it may be necessary to provide a safeguard to ensure that execution of this uniprocessor program does not proceed until the SIMD Controller 252 is done processing and returns bus control. This safeguard will ensure that the Host CPU 208 does not use data values in its cache that are invalid copies of data in the SIMD-RAMs 254. The cache copies could be invalid due to modification of the SIMD-RAM 254 contents by the SIMD program.

It is also necessary to provide a safeguard against further execution of the suspended uniprocessor program for the case when the Host CPU 208 services an interrupt in the middle of execution of a SIMD Controller 252 program. When the Host CPU 208 is completed with the interrupt, the SIMD Controller 252 should regain bus control until the SIMD program is done, rather than the Host CPU 208 proceeding with execution of the suspended uniprocessor program.

These safeguards can be provided, for example, by the system routine that was called by the uniprocessor program to start SIMD processing. This system routine started SIMD processing with, in the above example, an I/O write. To provide the required safeguards, it could, as a next step (after perhaps a few no-operation instructions (NOPs) if needed to allow the SIMD Controller 252 to get the bus), perform a read of a status register from an I/O port on the SIMD Controller 252 to test whether the SIMD Controller 252 has completed execution. It would be the responsibility of the SIMD Controller program to set a bit in this status register to signal completion as its last step in any called routine. Alternatively, the status register could contain a unique process ID or other data value, rather than a bit. In any event, the Host CPU 208 world loop on the test until the status register read signaled completion of the SIMD Controller 252. The process of reading of this register by the Host CPU 208 would require bus access by the Host CPU 208. When no interrupts occurred, the bus access would not happen until the SIMD Controller 252 was completed and released the bus. In these cases, the read would always indicate the SIMD Controller 252 had completed. However, if there was an interrupt, the Host CPU 208 might perform the read after the return from the end of the interrupt service processing. Seeing that the SIMD Controller 252 was not completed, the Host CPU 208 could then write to the SIMD I/O port to reinitiate the taking of bus control by the SIMD Controller 252. The Host CPU 208 would then attempt to read the I/O port to detect completion, as it had before.

Although the above description assumes use of an I/O port to start and flag completion of SIMD Controller 252 execution, a memory location could also be used. When using a memory location, it is important to ensure that it is non-cached, or that the write to the cache is also written to memory in the case of a data write by the Host CPU 208, to ensure that the SIMD Controller saw the written value in a timely manner. Similarly, in the case of a read of a memory-mapped status register on the SIMD Controller 252 by the Host CPU 208, it is important to ensure that the Host CPU 208 is not just reading an out-of-date cached value. Flushing the cache prior to any bus transfer to the SIMD Controller is another method of handling these cache issues.

SIMD-RAMs 254

Figure 5:
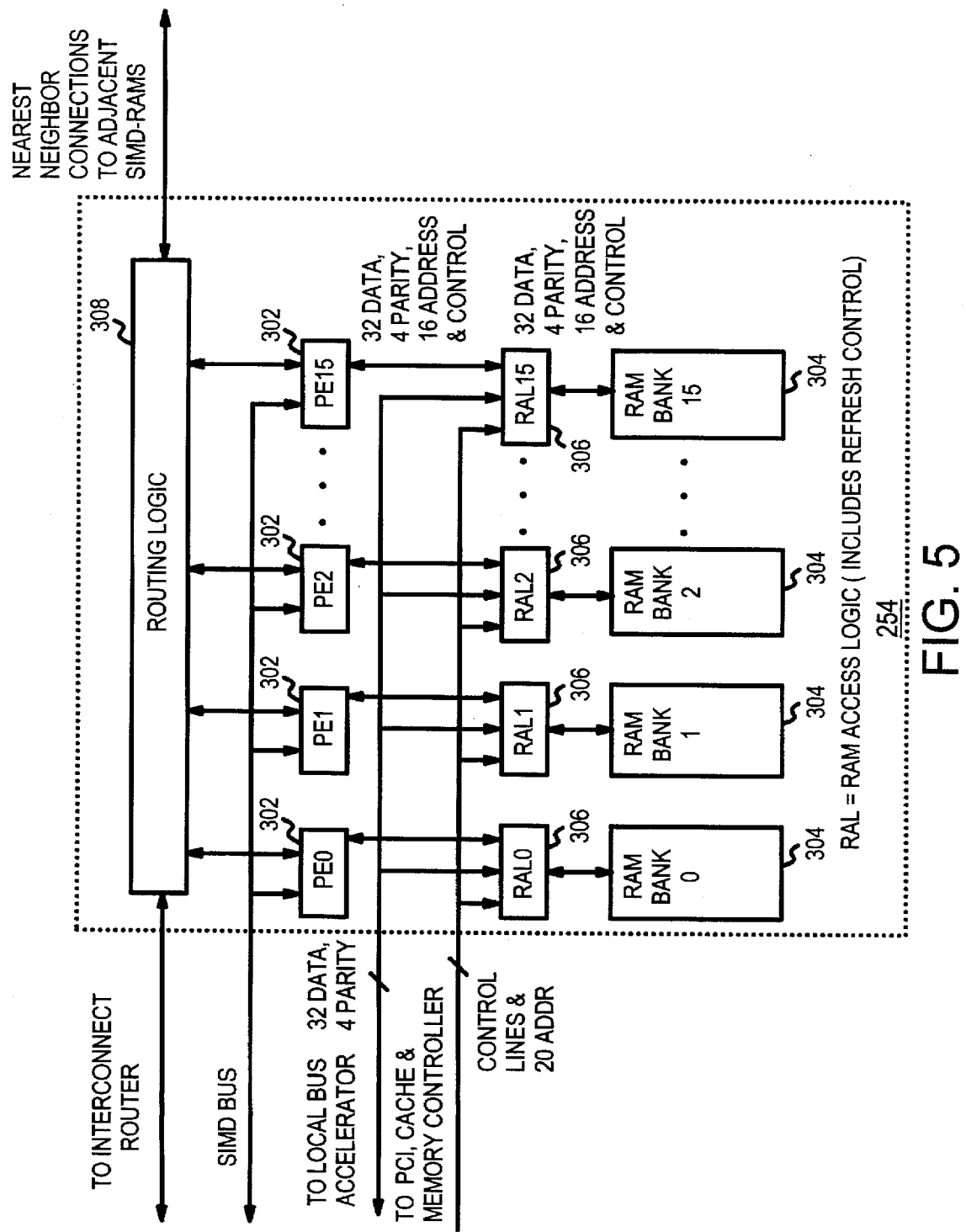
FIG. 5 is a block diagram of a SIMD-RAM device in accordance with the present invention.

FIG. 5 shows a block diagram of a SIMD-RAM device in accordance with the present invention. The SIMD-RAM device 254 shows a plurality of memory devices, in this case, dynamic random access memory (DRAM) 304, which are coupled to a plurality of processing elements (PE's) 302 via random access logic 306. The PEs 302 in turn are coupled to Routing Logic 308. The Routing Logic 308 in turn is coupled to the Interconnect Router 256 (FIG. 3). The PE's 302 are also connected to the SIMD bus 240. The DRAMs 304 can be directly accessed by the lines connecting to the PCI, cache and memory controller 214, and the lines connecting to the local bus accelerator 216.

Each PE contains a 32-bit wide data path and can perform atomic operations on bits, bytes, 16-bit words, and 32-bit words. Operations on 64-bit words and block operations could be performed by looping through two or more data values—these would not be atomic operations.

Since each DRAM 304 is independently addressed by its PE, autonomous indirect addressing can be performed, which allows each PE to use different pointers or array indexes while accessing its DRAM 304. Integer and floating point accelerators could be included in each PE. Execution autonomy is provided, in which specific PEs can be excluded from executing specific instructions by using IF statements.

The architecture of the SIMD-RAM 254 allows scaling to higher or lower density chips with more or fewer PEs 302, more or less memory 304, and different amounts of memory per PE. If the memory-per-PE ratio (64 kbytes-per-PE in the above example) is maintained, lower or higher density SIMD-DRAM 254 chips could be used without software changes. With this approach, an application program would see no difference, for example, between a system implemented with sixteen SIMD-RAM 254 chips, each having 1 Mbyte DRAM and 16 SIMD PEs, and a system implemented with a single SIMD-RAM 254 chip containing 16 Mbytes of DRAM and 256 PEs.

The embodiment of FIGS. 2, 3, and 5 show the invention with dynamic random access memory (DRAM) technology used to implement the memory storage locations in the SIMD-RAM 254. It is within the spirit and scope of the invention to use other technologies to implement the memory storage locations.

Memory Mapping & Data Structures

The SIMD Controller can pass data values to and from the Host CPU through the shared SIMD-RAM memory.

When SIMD processing is not being performed, the SIMD Controller 252 is idled and the DRAM 304 on the SIMD-RAM device 254 is usable by the Host CPU 208 as if it were conventional DRAM memory. In this mode, each SIMD-RAM 254 provides 1 Mbyte of storage to the Host CPU 208.

The DRAMs 304 are shared by the Host CPU 208, the SIMD Controller 252, and the PEs 302. The Host CPU 208, SIMD Controller 252, and PEs 302 can each access the memory in each access cycle as bits, bytes, 16-bit words, or 32-bit words. The SIMD Controller 252 has the same view of memory as the Host CPU 208—as a linear address space of addressable bytes organized, in this example, as 256k by 36 bits (32 data, 4 parity) per SIMD-RAM chip. The Host CPU 208 and SIMD Controller 252 can both use the memory for program instructions and data. The Host CPU 208 and SIMD Controller 252 will use the same physical address to access a given byte in memory, in order to facilitate the sharing of pointers by both devices. The PEs 302 use a different address mapping since, in this example, each PE sees just 16k words ×36 bits (32 data, 4 parity). Since the PEs operate under the control of the SIMD Controller and do not directly execute instructions from memory, they can use memory only for holding data.

FIG. 6 compares the address map of the Host CPU 208 to that of the PEs 302 for a system with 256 PE's (as might be provided by sixteen SIMD-RAM chips, each with sixteen PEs). By sequentially stepping through contiguous Host CPU 208 32-bit words, access is made to words appearing at identical addresses in successively numbered PEs. Wraparound occurs from the 32-bit word at byte N in the highest number PE (here PE 255) to the 32-bit word at byte N+4 in PE 0. Within 32-bit words, either little-endian or big-endian byte ordering could be used. The PEs could also be designed to support both big-endian or little-endian, in order to be used without modification in a variety of different systems.

The reason for stepping across PEs as one steps up in Host CPU 208 words is so that when a block of SIMD-RAM is allocated from Host CPU 208 memory space to SIMD processing, it will include memory that is mapped to all PEs. It also ensures that the span encompasses the same addresses for every PE. The 32-bit step size was chosen because it is convenient for mapping integers to PEs, and because the PEs are 32-bit devices. It should be understood, however, that other step sizes could be used and would be within the spirit and scope of the present invention.

A key issue in memory mapping is how data arrays and structures are passed between CPU programs and SIMD routines. Since the memory mapping was chosen to occur on 32-bit boundaries, transferring an array of 32-bit elements is easy. The array simply needs to have its starting element aligned to a memory word that is mapped to PE 0. Successive words will then be automatically mapped to successive PEs, which is what is desired for parallel execution. In the event there are more elements than PEs, wraparound automatically occurs from the highest-numbered PE to the next word in PE 0.

It is more difficult to map arrays with data elements of other sizes, such as char variables, strings, doubles, and data structures. These require special handling to ensure that successive values are properly placed in PE address space, despite the fact they are not 32-bit entities.

As an example, consider an array of 8-byte double words in CPU memory. To move this into the correct PE mapping, each 8-byte double word must be split in half and stored in contiguous locations in the address space for a given PE. This is equivalent to moving the two 4-byte words into non-contiguous locations in CPU address space. Note, for example, in FIG. 6, that an 8-byte double word occupying addresses 0 through 7 in PE 0 actually appears as two 32-bit words in CPU address space—the first is at CPU addresses 0 to 3, and the second is at addresses 1024 through 1027. The next double word, which is mapped to PE 1 at addresses 0 through 7, appears to the CPU as two 32-bit words—the first at CPU addresses 4 through 7, and the second at CPU addresses 1028 through 1031.

Because of the special handling needed to pass parameters that are not 32-bits in size, special library routines could be provided to pass parallel parameters between CPU and SIMD programs. These routines could execute block transfers between memory allocated to the CPU and PEs. The routines would accept arguments of a starting CPU address, a starting PE address, a data element size, and a data element count. Using this information, the block transfer routines could activate the Interconnect Routers to distribute data items as needed, with the correct alignment, typically starting with PE 0. Alternatively, the routines could shuffle data by executing a program on the Host CPU 208. Either way, since the data elements are already located in DRAM, this operation is always some kind of data shuffle. This solves the alignment problem for any arbitrary element size for parallel data. Note that this data shuffling is only used for parallel parameters which need to be mapped across the PEs. Scalar parameters can be passed as part of the SIMD function call using conventional parameter-passing protocols, since the SIMD Controller and CPU see the same address map.

If the Host CPU 208 has a cache, it is important to ensure that any writes performed by the Host CPU 208 have been transferred to the SIMD-RAM prior to passing the bus to the SIMD Controller 252, if the SIMD Controller 252 or PEs might access those written data values. One approach to ensure that this transfer occurs is to flush the cache prior to transferring control of the bus to the SIMD Controller 252. Another approach is to mark those memory areas that will be accessed by the SIMD Controller and PEs as non-cacheable.

In some cases, it may be desirable to limit the locations that the SIMD Controller and PEs access. To provide protection between the address spaces of different programs, the SIMD Controller 252 and each PE 302 could include address limit registers indicating the range of DRAM addresses each may use, along with allowed access types, such as read, write or execute. In such cases, if an access were made outside of the allowable limits or if the access was of the wrong type, a program trap would be issued to the SIMD Controller 252 or Host CPU 208, resulting in an error routine being executed.

Refresh

Like ordinary DRAMs, SIMD-RAMs implemented with dynamic memory technologies must be refreshed to maintain data integrity. During Host CPU 208 processing, the SIMD-RAM responds to the refresh controller on the PCI, cache and memory controller 214. As will be discussed below, it is advantageous to use a CAS-before-RAS refresh method. As with traditional DRAMs, during this CAS-before-RAS refresh, the SIMD-RAMs are responsible for providing their own refresh address using on-chip Refresh Address Registers.

During SIMD execution, the refresh controller on the PCI, cache and memory controller 214 is disabled. To maintain data integrity, the SIMD Controller 252 assumes responsibility for refresh. In some systems, the RAS and CAS signal outputs on the PCI, cache and memory controller 214 may not be tristate. In addition, these signals have tight loading and timing specifications. For these reasons, it may not be practical to have the SIMD Controller drive RAS and CAS directly. Accordingly, another approach, using special refresh commands, can be used.

These special refresh commands are similar to normal executable instructions in that they are issued by the SIMD Controller 252 over the instruction bus to the SIMD-RAM 254. They differ from normal instructions in that they cause the SIMD-RAMs 254 to perform a refresh cycle, rather than processing data. The SIMD Controller 252 generates refresh commands at a frequency sufficient to provide necessary refreshing. When these commands are issued, the SIMD Controller 252 skips incrementing its Program Counter, so that the correct executable instruction sequence can resume after the refresh. During these refreshes, the SIMD-RAMs 254 use their Refresh Address Registers just as they did with refreshes initiated by the Host CPU 208's CAS-before-RAS refresh cycle. This ensures that the refresh address sequence is maintained as program execution moves back and forth between the Host CPU 208 and the SIMD Controller 254.

The Interconnect Router 256

The Interconnect Router 256 provides high speed interprocessor communications. I't could be implemented as a wormhole router, or a crossbar. An alternative approach would be to use hypercube interconnections, at the cost of potentially more inter-chip wiring complexity. A variety of possible interconnect architectures are well documented in the literature, including papers such as "Study of Multistage SIMD Interconnection Networks", Howard Jay Siegal and S. Dianne Smith, Purdue University, Proceedings of the 5th Annual Symposium on Computer Architecture, 3-5 Apr. 1978, Palo Alto, Calif., USA, IEEE, New York, N.Y., USA, p. 223-229, and "The Universality of Various Types of SIMD Machine Interconnection Networks", Howard Jay Siegal, 4th Annual Symposium on Computer Architecture, 23-25 Mar. 1977, Silver Spring, Md., USA, IEEE, New York, N.Y., USA, p. 70-79.

A serial communications scheme could be used to further reduce wiring complexities. In addition to global interconnections provided by the Interconnect Router 256, each PE could also contain logic for nearest neighbor interconnections. This facilitates rapid up/down/left/right shifts of data between PEs, as is common, for example, in image and signal processing.

The use of am Interconnect Router 256 provides high speed interprocessor communication. It is possible to use the described invention without an Interconnect Router 256 by using only the nearest neighbor interchip communications of the SIMD-RAM chip 254, and the data movement capabilities of the Host CPU 208 and SIMD Controller 252, although such an implementation may reduce the performance of interprocessor communications.

Conclusion

A system in accordance with the present invention significantly increases the computing power of computer systems for personal use (including personal computers) by adding a SIMD computing capability. The architecture replaces some or all of the personal computer's conventional main memory, resulting in a cost saving that helps offset the added cost of the new components. The architecture is easily scaled across a range of performance simply by adding SIMD-RAM chips. The low cost nature of this architecture helps generate a high volume of sales, maximizing the architecture's appeal to software developers. Finally, the system in accordance with the present invention is useful in increasing the performance of embedded computing systems.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

I claim:

1. A circuit comprising:
    a first logic circuit means capable of issuing instructions;
    a second logic circuit means responding to the instructions; and
    a dynamic memory means, the first logic circuit means capable of causing a refresh of the dynamic memory means by inserting a new refresh instruction into a sequence of instructions.

2. The circuit of claim 1, further including a program counter means in the first logic circuit means, wherein the program counter's value is the same before and after the first logic circuit means inserts a refresh instruction into a sequence of instructions.

* * * * *